United States Patent [19]

Lange

[11] Patent Number: 4,754,807
[45] Date of Patent: Jul. 5, 1988

[54] SAND SCREEN FOR PRODUCTION OIL WELLS

[75] Inventor: Udo Lange, Celle-Alvern, Fed. Rep. of Germany

[73] Assignee: Otis Engineering Corporation, Dallas, Tex.

[21] Appl. No.: 23,219

[22] Filed: Mar. 9, 1987

[30] Foreign Application Priority Data

Apr. 29, 1986 [DE] Fed. Rep. of Germany ....... 3614537

[51] Int. Cl.$^4$ ............................................. E21B 43/08
[52] U.S. Cl. ...................................... 166/236; 166/51
[58] Field of Search ................ 166/51, 233, 235, 236, 166/278

[56] References Cited

U.S. PATENT DOCUMENTS

| | | | |
|---|---|---|---|
| 4,401,158 | 8/1983 | Spencer et al. | 166/278 |
| 4,424,864 | 1/1984 | Logan | 166/51 |
| 4,428,428 | 1/1984 | Smyrl et al. | 166/51 |
| 4,428,431 | 1/1984 | Landry et al. | 166/278 |
| 4,510,996 | 4/1985 | Hardin | 166/51 |
| 4,570,714 | 2/1986 | Turner et al. | 166/51 |

OTHER PUBLICATIONS

Otis, "Otis Single-Zone Sand Control System", Brochure, Oct. 1978.

Primary Examiner—Stephen J. Novosad
Assistant Examiner—Bruce M. Kisliuk
Attorney, Agent, or Firm—Dennis T. Griggs

[57] ABSTRACT

In oil and gas production installations, formation sand may pass through sand screens and enter the tubing, causing damage and increasing abrasive wear. Gravel used to prevent this often leaves gaps and lets formation sand pass through. The invention eliminates such gaps by incorporating an ordinary polished bore (11) in the sand screen (4, 7) to land and seal off the wash pipe (9). Two concentric tubes (4a, 4b) are connected to each other by a collar (17) whose inside surface is a polished bore (11) and whose outer side has supports (17a, 17b) for the tubes (4a, 4b) and the upset screens.

4 Claims, 3 Drawing Sheets

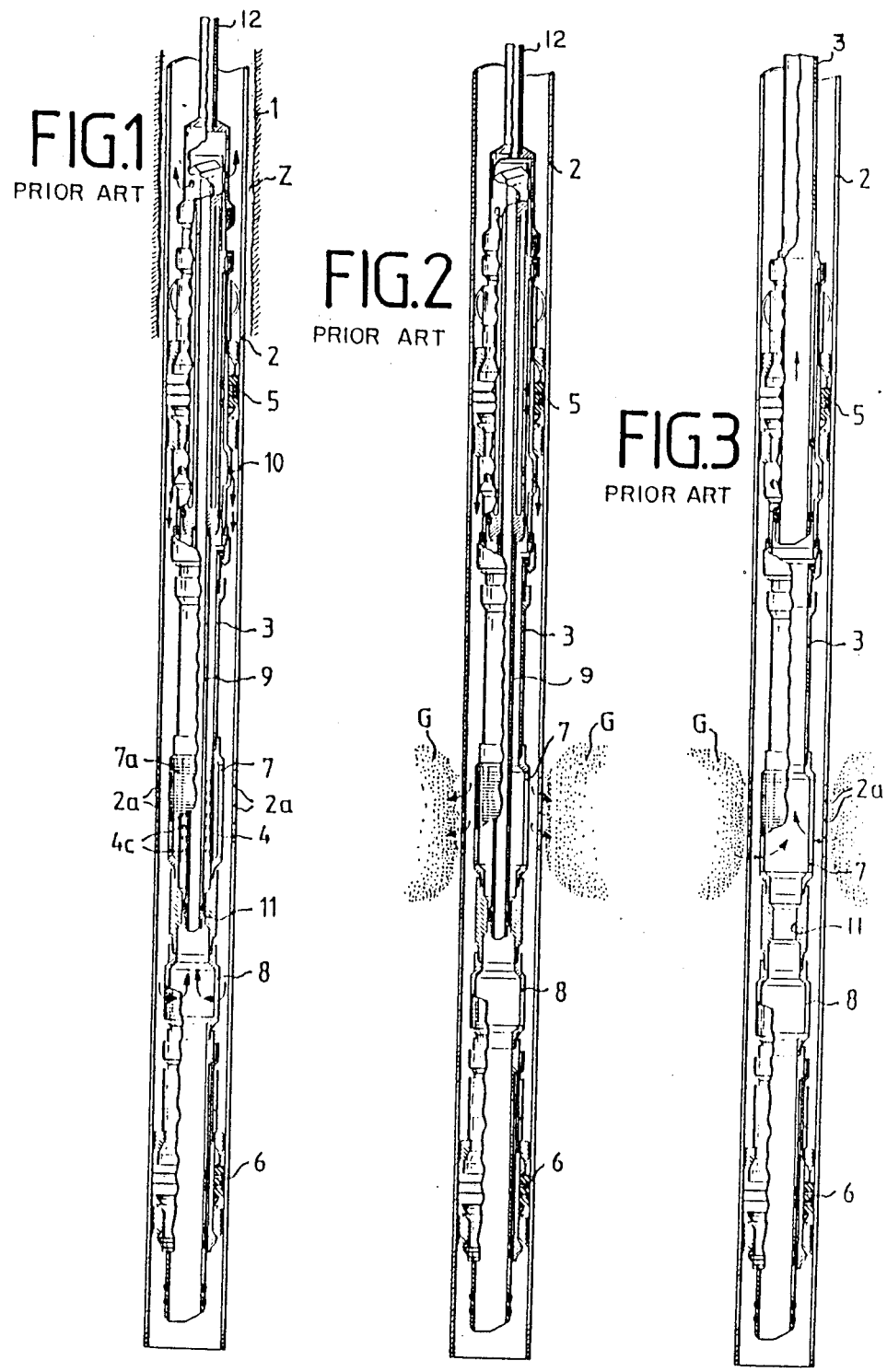

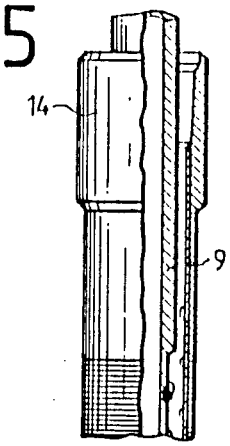
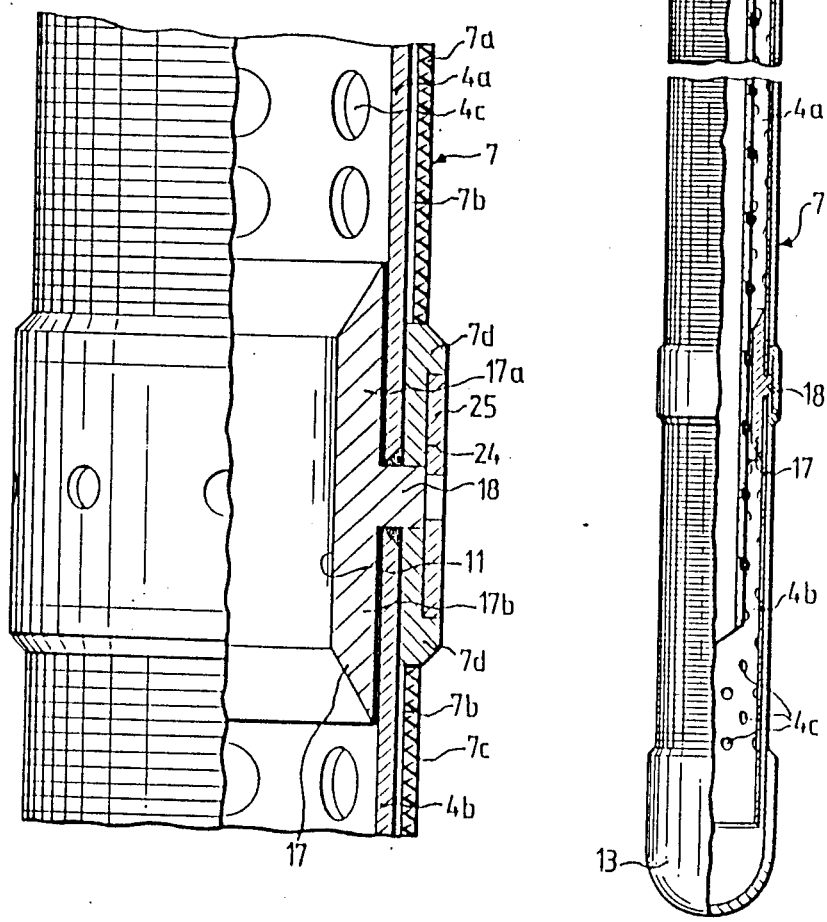

SAND SCREEN FOR PRODUCTION OIL WELLS

The invention is a sand screen as generally described under claim 1.

It is common practice in oil and/or gas wells to run one or more strings of casing and then to run the actual production tubing inside the casing. At the wellsite, the casing is perforated across productive zones to allow production fluids to enter the well bore. It is possible to have an open face across the oil- or gas-bearing zone, but it has been discovered that along with the oil or gas, formation sand is also swept into the flowpath: it is relatively fine sand that erodes components in the flowpath. It is also customary to install one or more sand screens in the flowpath opposite perforations in the casing or in a recess under the casing shoe. Packers may be set above and below sand screens to seal off the interval where production fluids flow into the tubing from the rest of the annulus. The annulus around the screen is packed with relatively coarse sand or gravel to reduce the amount of fine formation sand reaching the screen. A work string is used to spot the gravel around the screen. The gravel is pumped down the work string in a slurry of water or gel and spotted directly under the packer or above the sand screen. The gravel fills the annulus between the sand screen and the casing. Unfortunately, some spaces always remain that are not filled with gravel and this is unavoidable. These spaces sooner or later fill up with accumulated sand, forming sand plugs or bridges. Fine formation sand thus still finds its way through these bridges into the production flowpath, causing erosion. An improved gravel pack, containing no unfilled spaces, is thus essential for a more efficient sand screen.

The purpose of the invention is to improve gravel packing by greatly reducing or altogether eliminating cavities. The invention described under patent claim 1 does so.

Variations of the design are described in the following claims.

The realization that cavities occur primarily at the connections between the screen and other joints of pipe, particularly tubing, led to the invention. For example, one such spot is the seal around the washpipe and the threaded connection between the washpipe and the tubing serving as the work string. In principle, the invention consists of incorporating the polished bore receptacle into the sand screen joint to eliminate additional connections required to make up the polished nipple into the tubing string. The following drawings of several variant designs further illustrate and explain the invention.

BRIEF DESCRIPTION OF THE DRAWINGS

FIG. 1 shows a view of an oil well at the producing zone, with a typical work string performing a gravel pack operation.

FIG. 2 shows a later phase of the operation described in FIG. 1.

FIG. 3 and FIG. 4 illustrate the production phase after completing the operation described in FIG. 1.

FIG. 5 is a view of a sand screen illustrating the invention.

FIG. 6 is a cross-sectional view through the sand screen illustrated in FIG. 5 at the polished nipple.

FIG. 1 is a schematic drawing of a conventional oil well completion. The well bore (1) has been cased off with casing (2) and sealed with cement (Z) or a similar substance. A tubing string (3) has been run inside the casing (2). Perforations (2a) can be seen in the casing (2) at the depth where production fluids are to flow from the producing zone of the well (1) into the tubing (3). A sand screen (4) drilled with holes (4c) to allow the fluid to flow into the tubing has been made up in the tubing string (3). The sand screen (4) is located opposite the perforations (2a) in the casing as the tubing (3) is run into the well or it may be run directly opposite the open formation. The tubing (3) above and below the sand screen (4) can be sealed off by means of the packers (5, 6) in order to produce fluids from the producing zone only. A screen (7) has been placed around the sand screen (4) to keep foreign matter out of the tubing string (3). This screen consists mainly of wire (7a) wrapped around the pipe body in a spiral, and the coils are spaced at a distance equivalent to the size of the gravel to be retained. To hold the coils of wire securely in place, each individual coil is attached to ribs (7b) or some similar construction by welding, for example, and the ribs run parallel to the axis of the tubing (3). This sleeve-like screen (7) is placed over the screen body (4). Three holes (10) are provided in the tubing string (3) below the packer (5) and above the sand screen (4) through which gravel mixed with water or gel is injected or circulated into the annulus between the casing (2) and the screen (7). To do so, a washpipe (9) is run inside the tubing string (3) to spot the gravel slurry of water and/or gel below the sand screen (7) or around a second screen (8). By dividing the filter unit into a screen (7) and a lower telltale (8), premature gravel packing around the screen (7) is prevented and a sand bridge is thus avoided at that spot. A polished-bore nipple (11) is run between the screens (7, 8) in which the washpipe is landed in order to circulate the slurry to the telltale screen. In this way, any premature spotting of gravel is prevented, but spaces may be left around the polished nipple which are only filled with gel and not packed with gravel. For the purposes of an example, these are the places where no circulation takes place across the screen. This disadvantage is minimized or eliminated by the design of a screen consisting of two concentric tubes (4a, 4b) connected by a collar (17) as illustrated in FIGS. 5, 6, and 7. When the annulus between the casing (2) and the screen (8) is fully packed, the pumps will show a pressure jump at the surface, which serves to squeeze the remaining water and/or gel from the annulus between the casing (2) and the screen (8) into the formation. The slurry of gel and gravel is then dehydrated by the oil- or gas-bearing formation. At the same time, the perforations (2a) are filled with gravel. A greater jump in pressure indicates conclusion of gravel pack operations.

FIG. 2 shows how one or more pressure buildups at the screen (7) packed with gravel are indicated [arrows from screen (7) to perforations (2a)]. Finally, the washpipe (9) and the work string (12) (service seal unit or crossover tool) are pulled out of the packer (5) and the polished nipple (11) for the screen (4).

FIG. 3 illustrates the well in the production phase, with production tubing (3) set in the packer (5) and production fluids flowing into the screen (arrow).

FIG. 4 shows the well at the depth of the formation.

FIG. 5 shows a sand screen (4) in detail. To illustrate the design more clearly, the pipe body (4) is cut in half lengthwise. The top end is the connection to a joint of tubing (3), which is not shown. The bottom end is shown here with a bull plug (13), but it could also be a tapered threaded connection to make up with more pipe. The screen unit (4) consists of two concentric tubes (4a, 4b) placed end to end (see FIG. 6), both of which are drilled with a number of holes (4c) through which production fluids flow into the tubing string (3). The two tubes (4a, 4b) are connected to each other with a collar (17), one side of which has a special circular shoulder (18) functioning as a stop for the components of the screen, and the other side of which has two supports (17a, 17b) for the tubes (4a, 4b). Both tubes may be threaded to make up into the two supports (17a, 17b) (see FIG. 7). FIGS. 5 and 6 show a welded connection. Due to short fabrication time, welded connections have turned out to be preferable. The inside of the collar (17) is a polished bore (11) to seal off the washpipe (9) as it is stabbed in and pulled. The circular shoulder (18) on the collar (17) is dimensioned to function as a stop for the screens (7a, 7b). After makeup with the collar (17), the screens (7a, 7b) are pushed down over the tubes (4a, 4b) and held in place by the two end connectors (13, 14) and the circular shoulder (18). The end connectors (13, 14) are made up after the screens (7a, 7b) are made up on the tubes (4a, 4b).

FIG. 6 shows the screen body (4), the tubes (4a, 4b), the screen (7) and the collar (17) in detail. The tubes (4a, 4b) are welded to the collar (17). A special stop (7d) is provided for both screens (7a, 7b) and this stop extends around the collar (17), and the tubes (4a, 4b) are connected to it. The stop (7d) and the screens (7a, 7b) form a single unit. The stop may have a groove (24) for a retainer collar (25). The stop (7d) and the concentric ribs (7b) of the screen (7) may be a single unit or they may be welded together. The retainer collar (25) in the groove (24) must retain both stops. The polished bore (11) inside the collar (17) is chamfered to prevent damage and facilitate stabbing and pulling the washpipe (9).

FIG. 7 illustrates a variant of the sand screen shown in FIGS. 5 and 6. Opposite the supports (17a, 17b), the collar (17) has threads (17c, 17d) for making up the ends of the tubes (4a, 4b), which have mating threads. Both ends of the collar (17) have a recess (171, 172) in which the stops (7d) for the screen (7) are inserted. The collar (17) itself covers the area of contact between the stops (7d) and the collar (17).

Figure 4:
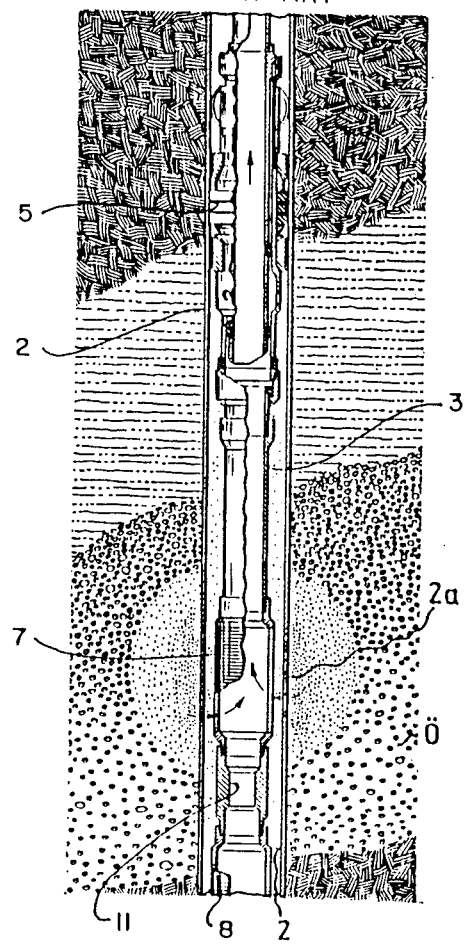
Figure 7:
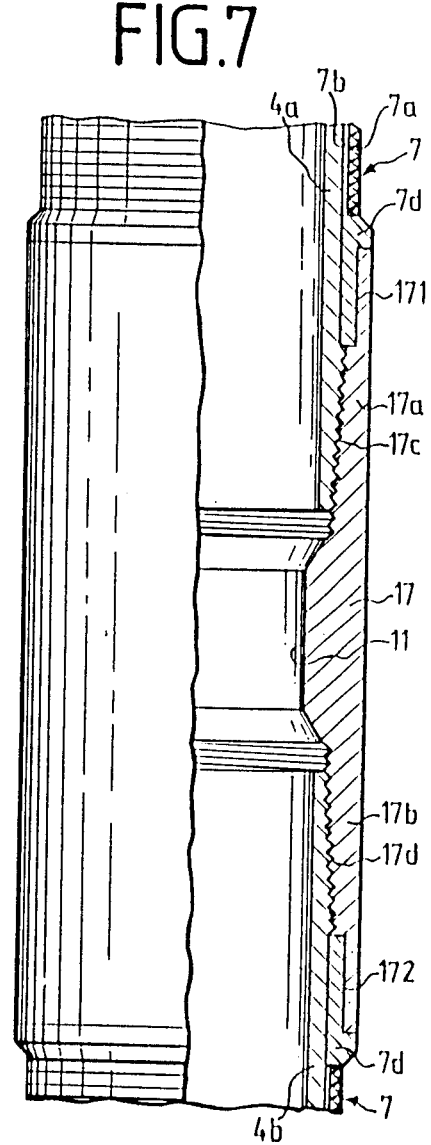
FIG. 7 is a variant of FIG. 6.

After the work string is pulled from the casing and the longer tubing string (3) is landed in the packer, both screens (7a, 7b) are ready for production. The collar (17) is designed to be narrow enough to have no noticeable effect on the filtering efficiency of the screen.

I claim:

1. A sand screen for use in a production oil well of the type having a tubing string for supporting the sand screen within the well adjacent a producing formation, said screen comprising first and second inner tubes disposed in end-to-end relation, both tubes having flow ports through which production fluids may flow into the tubing string; an annular collar concentrically disposed between said inner tubes, said collar having first and second end portions secured to said first and second inner tubes, respectively; said collar comprising a cylindrical body portion received within the bores of said first and second inner tubes, respectively, and having an annular shoulder portion projecting radially outwardly between said first and second inner tubes; said collar having a polished bore defining a central flow passage for sealing engagement with a retrievable wash pipe; first and second outer screens concentrically disposed about said first and second inner tubes, respectively; and, first and second annular stop members concentrically disposed about said first and second inner tubes, said first and second annular stop members being disposed between said radially projecting collar shoulder and said first and second outer screens, respectively.

2. An improved sand screen as defined in claim 1, including an annular retainer collar concentrically disposed in overlapping relation with said first and second annular stop members and said collar shoulder.

3. An improved sand screen having an upper screen section, a lower screen section, an annular collar joining said upper screen section to said lower screen section, said annular collar having a polished bore defining a central flow passage for sealing engagement with a retrievable wash pipe, and said upper and lower screen sections each having lateral flow ports formed therein for promoting fluid communication between said central flow passage and annular regions immediately above and below said annular collar, said collar comprising a cylindrical body portion received within said lower and upper screen sections, respectively, and having an annular shoulder portion projecting radially outwardly between said lower and upper screen sections; and, means coupled to said lower and upper screen sections and to said annular shoulder portion for securing said screen sections to said annular collar.

4. A sand screen for use in a production oil well of the type having a tubing string for supporting the sand screen within the well adjacent a producing formation, said screen comprising first and second inner tubes disposed in end-to-end relation, both tubes having flow ports through which production fluids may flow into the tubing string; an annular collar concentrically disposed between said inner tubes, said collar having first and second end portions secured to said first and second inner tubes, respectively; said collar having a polished bore defining a central flow passage for sealing engagement with a retrievable wash pipe; said collar comprising a tubular member having a support portion formed on each end thereof and having threads for makeup with mating threads carried by said first and second inner tubes, said collar having a shoulder portion projecting radially inwardly into said flow passage, said polished bore being formed on the inside diameter of said collar shoulder; first and second annular stop members disposed between said first and second support portions and said first and second inner tubes, respectively; and, first and second outer screens concentrically disposed about said first and second inner tubes, respectively.

* * * * *